Sept. 15, 1942.                N. A. CHRISTENSEN                2,296,145
                              PRESSURE REDUCING MEANS
                     Filed Sept. 6, 1939           2 Sheets-Sheet 1
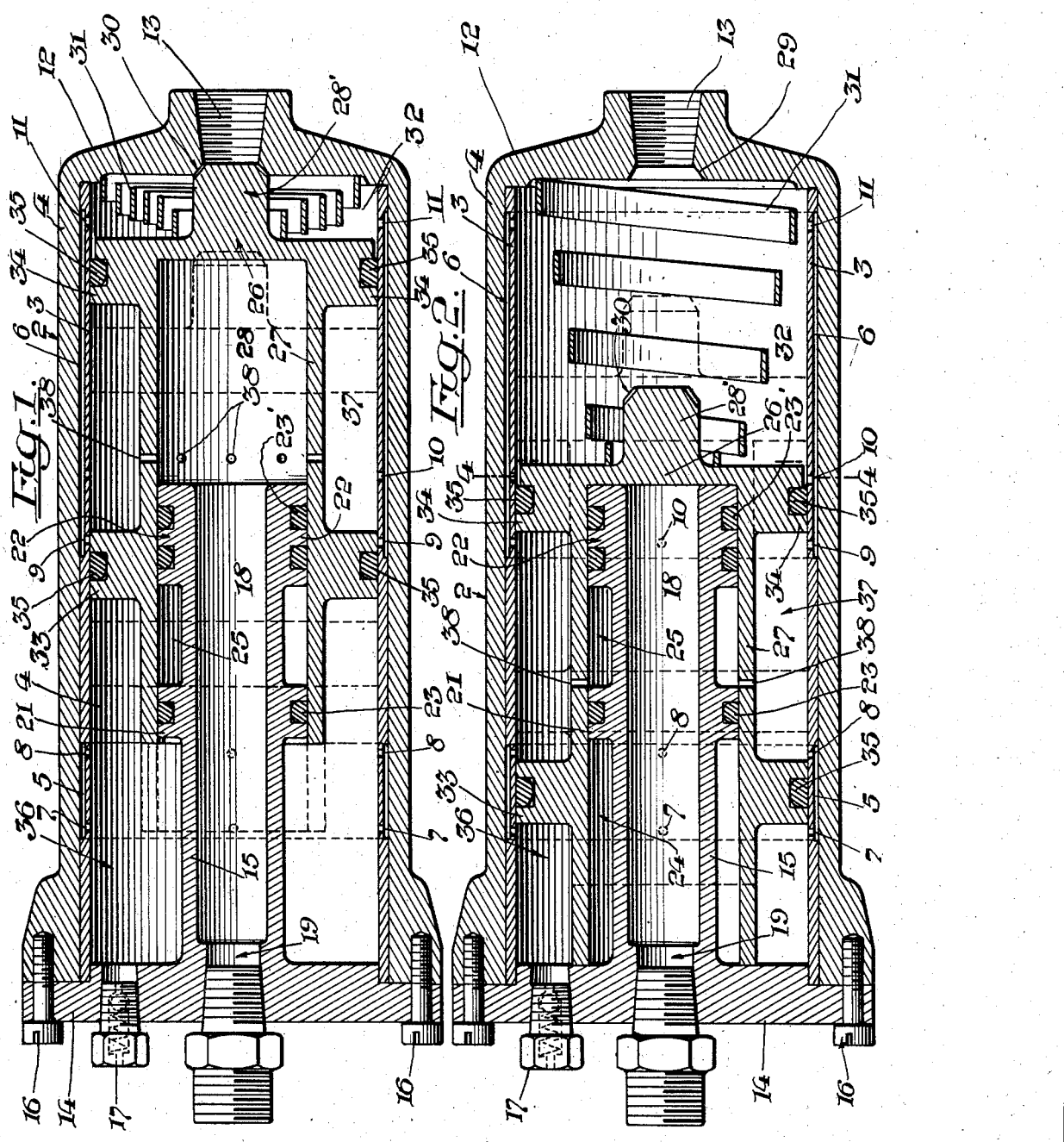
INVENTOR.
Niels A. Christensen
BY
                ATTORNEY.

Sept. 15, 1942.    N. A. CHRISTENSEN    2,296,145
PRESSURE REDUCING MEANS
Filed Sept. 6, 1939    2 Sheets-Sheet 2
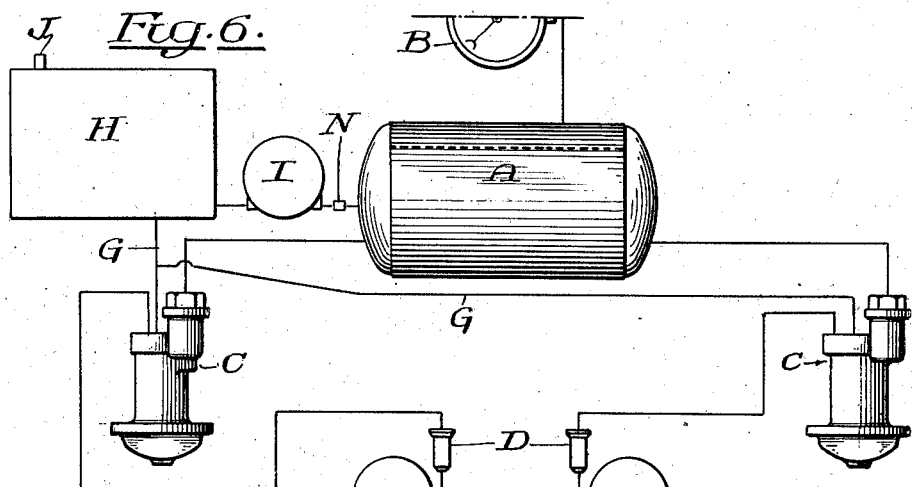
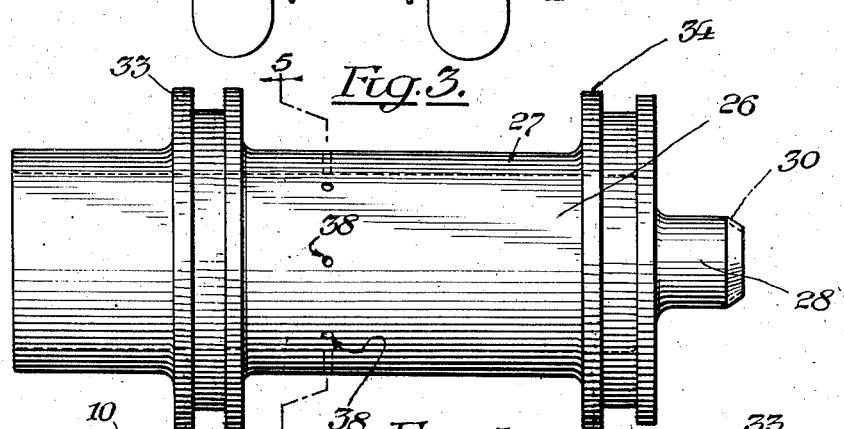
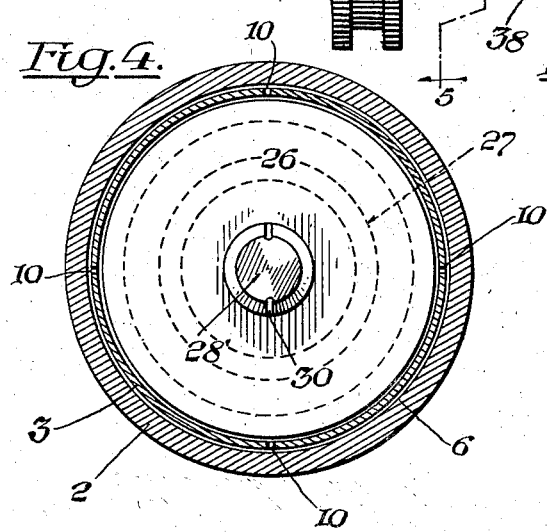
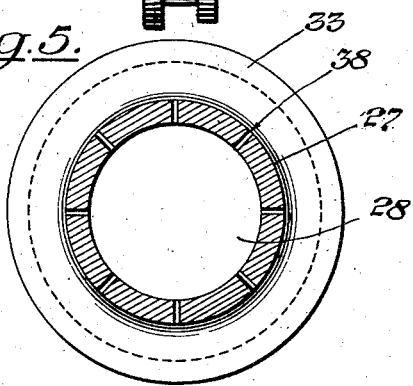
INVENTOR.
Niels A. Christensen
BY
ATTORNEY.

Patented Sept. 15, 1942

2,296,145

UNITED STATES PATENT OFFICE 2,296,145

PRESSURE REDUCING MEANS

Niels A. Christensen, Cleveland, Ohio

Application September 6, 1939, Serial No. 293,548

12 Claims. (Cl. 60—54.6)

This invention relates to pressure reducing means or valve for hydraulic braking systems for aircraft and the like and while adaptable to any hydraulic brake system, it is particularly applicable to aircraft and other systems where the fluid pressure is to be reduced and held constant. The principal object, therefore, of the invention is the provision of an improved pressure reducing means capable of receiving fluid at a high pressure, reducing it to a lower pressure and maintaining it constant.

In the operation of the majority of airplanes, motor driven hydraulic pumps are used to control navigating instruments, retractable landing gear, bomb doors and other miscellaneous units, most of which require pressure from six hundred to a thousand pounds per square inch. However, the braking units usually require pressures of only one hundred to a hundred and fifty pounds per square inch or a maximum of two hundred pounds per square inch. Other types of braking units require pressures from four hundred pounds per square inch upwards. It is, therefore, necessary to insert between the metering control valve and the hydraulic brake, a reducing medium. Hence, a further object of the invention is the provision of a light weight reducing means, simple and inexpensive in construction and positive and efficient in operation.

In the drawings accompanying and forming a part of this specification, Fig. 1 is a longitudinal section of this improved pressure reducing means in one position of the piston in the cylinder, illustrating in dotted lines the position of the piston in the cylinder during service application of the brakes.

Fig. 2 is a similar view when the brakes are released, illustrating in dotted lines another position of the piston in the cylinder during service application of the brakes.

Fig. 3 is a detail view of the operating piston.

Fig. 4 is a sectional view on the line 4—4 of Fig. 2.

Fig. 5 is a sectional view on the line 5—5 of Fig. 3, and

Fig. 6 is a view illustrating the position of this improved means in an air-craft braking system.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawings since the invention is capable of other embodiments, and that the phraseology employed is for the purpose of description and not of limitation.

As a matter of explanation, it is deemed advisable to describe at this point the position of this improved reducing means in a general assembly of a braking system.

Referring to Fig. 6, the supply tank A is provided with the usual gauge B indicating the pressure of the fluid. Lines lead from the tank A to metering control valves C usually operated by the foot control or other braking lever (not shown). From these valves C, lines lead to the reducing means D and thence to the brakes or brake drums E adjacent to the wheels F. In other words, the reducing means is placed between the metering control valves C and brakes E directly in the line connecting these parts. The control valves C meter the fluid from zero to maximum head pressure to the reducing means D and this means, in turn, reduces the pressure proportionately in the brake. In short, if the head pressure is six hundred pounds from the metering control valve to the reducing means and the reducing means has a reduction ratio of four to one, the output pressure from the reducing means will be a hundred and fifty pounds per square inch.

The valves C are provided with a release port connected by tubes G for escape of the liquid from the high pressure cylinder 28 hereinafter described, of the pressure regulator D when in brake release position. The amount of liquid used in the brake application escapes through the control valve C into the supply tank H which is provided with the vent J to atmosphere. The tank H is connected to the suction side of a pump I which returns the liquid to the pressure reservoir A through the check valve N. A certain volume of the air is left in the tank A and is compressed by the incoming liquid, this air thus confined forming a cushion in the upper part of the tank A.

Pressure from this compressed air is available for brake application through the liquid medium at all times during normal functioning of the oil pumps and is still available for many brake applications if the oil pump or pressure source fails, in which event, the check valve N will close and thus retain the pressure in the reservoir or tank A. A safety bypass is provided in the pump and is adjusted to the required maximum pressure.

This improved pressure reducing means comprises a main casing or housing 2 within which and adjacent to the inner wall a shell or sleeve 3 is closely fitted and the casing 2, together with the sleeve 3 form the outer cylinder generally denoted by 4. Between the casing 2 and sleeve 3 annular chambers or passages 5 and 6 are provided and it will be obvious that the two-part construction of the cylinder renders the construction of these chambers a simple matter.

The annular chamber 5 communicates with the interior of the cylinder 4 by means of laterally extending ports 7 and 8 and the annular chamber 6 communicates with the interior of the cylinder 4 by means of laterally extending ports 9, 10 and 11. At one end of the cylinder 4, as the outlet end, the casing 2 is closed by a part thereof as 12 and is provided with an outlet opening 13 which may be threaded if desired or otherwise provided with means for attachment to the line leading to the brakes E of the wheels F.

The other end of the cylinder 4 is closed by means of an enlarged head 14 of an interior stationary piston 15 and is secured to the casing 2 of the cylinder 4 by suitable means such as bolts 16. An escape port or vent 17 is located in the enlarged end or head 14 of the piston 15 communicating with the interior of the cylinder 4, the purpose of which will be hereinafter described.

The interior of the piston 15 has a bored passage or chamber 18 extending practically its entire length and open at its inner end, its opposite end communicating with a threaded inlet opening 19 adapted to be secured to the line leading from the metering control valves C. The exterior portion of the piston 15 is provided with outwardly extending flanges 21 and 22 for the reception of suitable packing rings 23 and these extensions form the annular chambers 24 and 25.

Slidably located within the cylinder 4 is a piston 26 having a sleeve 27 forming a cylinder 28 and this cylinder 28 forms a high pressure fluid chamber between the piston 26 and inlet 19. This cylinder 28 fits and slides exteriorly over the piston 15. The piston 26 is provided with a forwardly extending valve 28' which, as shown in Fig. 1, closely fits a suitable beveled valve seat 29 at the outlet end of the cylinder 4. The valve 28' has metering ports 30 leading to the outlet opening 13. A spring 31 is located between the head 12 of the cylinder 4 and the head of the piston 26 in the chamber 32 which is the low pressure chamber between the piston 26 and outlet 13.

The sleeve portion 27 of the piston 26 forming the cylinder 28 is of suitable size to permit it readily to slide over the outwardly extending flanges 21 and 22 of the stationary piston 15. This sleeve portion 27 also has outwardly extending flanges 33 and 34 for the reception of packing rings 35 and adapted to slide along the inner wall of the cylinder 4. The flange 34 may be formed as a part of the piston 26. The flanges 33 and 34 form chambers or passages 36 and 37 (see Fig. 2).

The sleeve portion of the movable piston is provided with a series of laterally extending ports 38 located between the outwardly extending flanges 33 and 34 and communicating with the cylinder 28 and annular chamber 37 when the ports are open as shown in Fig. 1.

The return spring 31 overcomes the friction set up by the seal rings 23 and 35 plus the slight weight of the piston to permit the oil in the chamber 18 and cylinder 28 to back up against the control valve when the control valve is in the released position. The check valve 17 is of a one-way passage type and if any fluid pressure builds up in the chamber 36 it can pass out through this check valve to the atmosphere or be piped away. A screened vent may be used instead of a check valve but I prefer a check valve as it prevents entrance of foreign matter into the space 36. If desirable, the check valve may be provided with a light spring to hold it on its seat and prevent spilling of liquid if the plane assumes abnormal angles in flight. It will be noted that the circulation of the fluid within the cylinder 4 is such that the packing rings are at all times freely and generously lubricated to permit their free sliding along the contacted surfaces and to provide for the least possible amount of wear.

The operation of the device described and illustrated in the drawings is as follows: referring to Fig. 2 which shows the position of the parts in release position, there is no pressure in any part of the regulator mechanism. The brake cylinders E and low pressure chamber 32 are replenished with liquid when required through ports 7, 8, 9, 10 and 11. For a braking operation, the pilot admits the high pressure liquid which enters through the piston 15 and acts on the bottom area of the cylinder 28, causing the piston 26 to move to the right, first cutting off chamber 37 from chamber 36 as the packing rings 35 have passed over the ports 10 and 8 which entraps the liquid contained between the piston 26 and brake cylinder E. The amount of pressure admitted through the control valve C acts on the area of the bottom of the cylinder 28 (the piston 15 merely serves as a tight sliding joint closing the open end of the cylinder 28). The working parts of the regulator will now be in the position shown in dotted lines in either Fig. 1 or Fig. 2, determined by the amount of liquid displacement required by the brakes. In the present instance, the area ratio between the cylinder 28 and piston 26 is 1 to 4, therefore, with one hundred pounds per square inch for instance in the cylinder 28, the piston 26 will exert a pressure on the entrapped brake liquid, barring friction, of twenty-five pounds per square inch. Thus, it is clear that the pilot can fully modulate the brake application from zero to maximum of the high pressure available by increasing or decreasing the pressure in the cylinder 28 by opening or closing his control valve or holding brakes in a steadily applied position.

Maximum displacement of the piston 26 is much greater than the normal amount required in the brake cylinder. Replenishment barring accidental leakage will only be required at long intervals. By releasing the pilot's control lever, the pressure in the cylinder 28 will disappear into the tank H and the parts will again assume the position shown in Fig. 2, and the brake cylinder will again be connected with chambers 36 and 37. The amount of liquid confined in the spaces 36—37 does not perform any other part in the application or release of the brake than that of a part of the passage for the functioning of the reducer mechanism, but they act as a reserve supply which, up to its capacity, will replenish the liquid in the brakes.

The normal operation of the brakes will be seen in dotted lines in Figs. 1 and 2, the high pressure liquid being completely separated from the low pressure liquid and the action takes place through area differentiation, eliminating uncertainty of the conventional pressure reducing mechanisms and the consequent damage to equipment not designed for high pressure. This applies more particularly to aviation brakes where there is constant danger of nose tipping by too severe brake application. In normal service operation the piston 26 with its cylinder 28 moves to the right but with brakes properly adjusted this travel does not uncover ports 38 but varies in amount depending on brake adjustment. When a larger amount of liquid is displaced the ports 38 will be uncovered by packing 23' and liquid under high pressure will pass through ports 38, 9, 10 and 11 into the space 32. This replenishment by high pressure liquid takes place almost instantly when the ports 38 are uncovered and will act on the large area of the piston 26 driving it to the left, closing ports 38. If the travel to the right is sufficient to seat valve 28', the high pressure liquid is controlled and metered as hereinafter explained.

Referring now to Fig. 1 of the drawings, normally the cubic volume of brake liquid on the right hand end of the differential piston 26 is the amount shown in Fig. 2 and, barring slight leaks, is nearly constant in volume, subject only to temperature variations, but in this device automatic replenishment from the high pressure source takes place in case of loss or part loss of liquid on the right hand side of the piston 26, in which event, the piston 26 will travel farther to the right and uncover ports 38 and high pressure liquid will pass through 9, 10, 11 and 13, valve 28' has been seated and pressure passes through the metering ports 30, which construction reduces the shock caused by the high pressure liquid. As the higher pressure piles up on the piston 26, said piston will move to the left causing the port 38 to be closed by the packing ring 23'. Release of pressure from the cylinder 28 through the operator's valve and the action of the spring 31 causes the mechanism to again assume the position shown in Fig. 2.

It is to be understood that, by describing in detail herein any particular form, structure or arrangement, it is not intended to limit the invention beyond the terms of the several claims.

Having thus explained the nature of my said invention and described a way of constructing and using the same, although without attempting to set forth all of the forms in which it may be made or all the modes of its use, I claim:

1. A fluid pressure reducing power means comprising a cylinder having an inlet and outlet, a telescopic piston having an internal chamber of variable volume shiftable in said cylinder and being in communication with said inlet whereby fluid pressure exerted within the piston will effect a reduced continuing pressure on said fluid within said cylinder and outlet, and means in said piston for permitting fluid to pass from the chamber to the cylinder and outlet near the end of the projectile stroke of said piston.

2. A fluid pressure reducing power means comprising a cylinder having an inlet and an outlet, a telescopic piston having an internal chamber of reduced variable volume shiftable in said cylinder and in communication with said inlet whereby fluid pressure exerted within the piston will effect a reduced continuing pressure on fluid within said cylinder and outlet, means for permitting fluid under higher pressure to pass from the chamber to the outlet and cylinder near the end of the projectile stroke of said piston, and means cooperating with the piston and outlet for metering fluid from said outlet during passage of higher pressure fluid from said chamber to said cylinder.

3. A fluid pressure reducing power means comprising a cylinder having an inlet and outlet, a shiftable telescopic piston therein, a variable chamber in said piston in communication with said inlet, said piston being shiftable by pressure fluid in the chamber, the shifting of said piston exerting a reduced but continuing pressure on the fluid in said cylinder and at its outlet, and ports connecting the variable chamber with the cylinder upon predetermined movement of said piston.

4. A fluid pressure reducing power means comprising a cylinder having an inlet and outlet, a shiftable piston therein, a closed cylinder in said piston in communication with the inlet, said piston shiftable by fluid pressure upon the inner cylinder, the shifting of said piston exerting a reduced continuing pressure on the fluid in said first cylinder and at the outlet, ports connecting the inner cylinder with the outer cylinder upon predetermined movement of said piston, and means cooperating with said piston and outlet for metering fluid through said outlet upon passage of fluid from one cylinder to the other.

5. A fluid pressure reducing means comprising a cylinder having an inlet and outlet, a piston shiftable in said cylinder and separating the inlet from the outlet and providing a low pressure fluid chamber between said piston and the outlet, a closed cylinder in said piston forming a high pressure fluid chamber between the piston and the inlet, said piston shiftable by the fluid in the inner closed cylinder whereby fluid will be forced through the outlet at reduced pressure, means for permitting passage of fluid at high pressure from the high pressure chamber to the low pressure chamber upon predetermined movement of the piston, and means cooperating with the piston and outlet for metering fluid at the outlet.

6. A fluid pressure reducing means comprising a cylinder having an inlet and outlet, a piston shiftable in said cylinder and separating the inlet from the outlet and providing a low pressure fluid chamber between said piston and the outlet, a closed cylinder in said piston forming a high pressure fluid chamber between the piston and the inlet, said piston shiftable by the fluid in the inner closed cylinder whereby fluid will be forced through the outlet in the low pressure chamber at reduced pressure, and an escape port in said first cylinder in communication with the low pressure chamber when said piston is in retracted position, said escape port being closed upon initial movement of said piston.

7. A fluid pressure reducing means comprising a casing, a cylinder in said casing, an inlet and outlet in said cylinder, a piston in the cylinder separating the inlet and outlet and providing a low pressure chamber between the piston and the outlet, a closed cylinder in said piston providing a high pressure chamber between the stationary hollow piston and inlet, a piston in said last cylinder, one of said pistons shiftable relative to the other whereby high pressure fluid passed from the inlet to the inner cylinder will effect a relative shifting of said pistons to exert a continuing reduced pressure on the fluid at the outlet, and means for permitting passage of fluid from the high pressure chamber to the low pressure chamber upon predetermined movement of the piston.

8. A fluid pressure reducing means comprising a casing, a cylinder in said casing, an inlet and outlet in said cylinder, a piston in the cylinder separating the inlet and outlet and providing a low pressure chamber between the piston and the outlet, a cylinder in said piston providing a high pressure chamber between the piston and inlet, a piston in said last cylinder, one of said pistons shiftable relative to the other whereby high pressure fluid passed from the inlet to the inner cylinder will effect a relative shifting of said pistons to exert a reduced pressure on the fluid at the outlet, means for permitting passage of fluid from the high pressure chamber to the low pressure chamber upon predetermined movement of the piston, and means cooperating with the piston and outlet for metering fluid at the outlet during passage thereof from the high to the low pressure chamber.

9. A fluid pressure reducing means comprising a casing, a cylinder having an inlet and outlet in said casing, a shiftable piston in said cylinder separating the inlet and outlet and providing a low pressure chamber between the piston and outlet, a cylinder in said piston providing a high pressure chamber between the piston and inlet, a stationary piston in said last piston and having a passage therethrough from the inlet to said inner cylinder whereby upon passage of the fluid into the inner cylinder said shiftable piston will be shifted to exert a reduced pressure upon the fluid at the outlet, and ports and passages communicating with the casing, pistons and chambers for permitting passage of fluid from the high pressure chamber to the low pressure chamber upon predetermined movement of the shiftable piston.

10. A fluid pressure reducing means comprising a cylinder having a high pressure inlet and a low pressure outlet, a hollow shiftable piston in said cylinder having a pair of spaced flanges engaging said cylinder to space the piston therefrom and to provide a low pressure chamber in communication with said low pressure outlet, a replenishing chamber and an intermediate chamber, said cylinder having longitudinal ports always in communication with said intermediate and low pressure chambers, said cylinder having a second longitudinal port communicating said replenishing chamber with said intermediate chamber, said piston having a high pressure port communicating the intermediate chamber with the interior of said piston, and a stationary piston connecting the high pressure inlet with the interior of said hollow piston and acting to open said high pressure port to the longitudinal ports connecting with the low pressure chamber.

11. A fluid pressure reducing means comprising a cylinder having a high pressure inlet and a low pressure axial outlet, a hollow shiftable piston in said cylinder having a pair of spaced flanges engaging said cylinder to space said piston therefrom and to provide a low pressure chamber always in communication with said low pressure outlet, a replenishing chamber between the flanges of said piston, said piston being hollow to provide a high pressure chamber with a high pressure port communicating with the intermediate chamber, a stationary hollow piston slidably mounted in said movable hollow piston and communicating with said high pressure inlet, said stationary piston acting to open and close said high pressure port upon relative movement of said pistons, and said movable piston having a valve seatable upon the low pressure outlet and provided with metering characteristics upon excessive movement of said movable piston to modify the shock of high pressure to the low pressure outlet.

12. A fluid pressure reducing means comprising a cylinder having a high pressure inlet and a low pressure outlet, a hollow piston shiftable in said cylinder having a pair of spaced flanges engaging said cylinder to space said piston therefrom and to provide a low pressure chamber always in communication with said outlet, a replenishing chamber and an intermediate chamber between the flanges of said piston, said cylinder having a longitudinal passage with a port at one end always communicating with said low pressure chamber and a port at its other end always communicating with said intermediate chamber, said piston having a high pressure port connecting its interior with said intermediate chamber, and a stationary hollow piston mounted in said movable piston and controlling said high pressure port to open the same and effect communication between the high and low pressure chambers near the end of the stroke of said movable piston.

NIELS A. CHRISTENSEN.